(12) United States Patent
Paul et al.

(10) Patent No.: US 9,305,301 B2
(45) Date of Patent: Apr. 5, 2016

(54) METHOD AND SYSTEM FOR PROVIDING REAL-TIME COMMUNICATIONS SERVICES

(71) Applicant: Infosys Limited, Bangalore, Karnataka (IN)

(72) Inventors: Sanjoy Paul, Bangalore (IN); Karthik Srinivasan, Bangalore (IN)

(73) Assignee: Infosys Limited (IN)

( * ) Notice: Subject to any disclaimer, the term of this patent is extended or adjusted under 35 U.S.C. 154(b) by 0 days.

(21) Appl. No.: 13/683,355

(22) Filed: Nov. 21, 2012

(65) Prior Publication Data

US 2013/0084830 A1 Apr. 4, 2013

Related U.S. Application Data

(62) Division of application No. 13/071,668, filed on Mar. 25, 2011, now Pat. No. 9,111,288.

(30) Foreign Application Priority Data

May 7, 2010 (IN) .......................... 1276/CHE/2010

(51) Int. Cl.
*G06Q 30/02* (2012.01)
*G06Q 30/04* (2012.01)
*H04L 29/06* (2006.01)
*H04W 28/16* (2009.01)
*H04L 29/08* (2006.01)

(52) U.S. Cl.
CPC ............... *G06Q 30/02* (2013.01); *G06Q 30/04* (2013.01); *H04L 29/06* (2013.01); *H04L 65/1069* (2013.01); *H04L 67/025* (2013.01); *H04L 67/18* (2013.01); *H04W 28/16* (2013.01)

(58) Field of Classification Search
CPC ........ G06Q 30/02; G06Q 30/04; H04L 29/06; H04L 65/1069; H04W 28/16
See application file for complete search history.

(56) References Cited

U.S. PATENT DOCUMENTS

| | | | |
|---|---|---|---|
| 6,519,636 B2 | 2/2003 | Engel et al. | |
| 6,976,087 B1 | 12/2005 | Westfall et al. | |
| 7,096,481 B1 | 8/2006 | Forecast et al. | |
| 7,969,886 B1 | 6/2011 | Hoichman | |
| 7,970,820 B1 | 6/2011 | Sivasubramanian et al. | |
| 8,194,701 B2 * | 6/2012 | Khan et al. | 370/469 |
| 2002/0188732 A1 | 12/2002 | Buckman et al. | |
| 2004/0139024 A1* | 7/2004 | So | 705/51 |
| 2004/0261092 A1 | 12/2004 | Addington et al. | |
| 2004/0261094 A1* | 12/2004 | Huslak et al. | 725/25 |
| 2009/0313665 A1 | 12/2009 | Rouse | |

* cited by examiner

*Primary Examiner* — Asfand Sheikh
(74) *Attorney, Agent, or Firm* — Lerner, David, Littenberg, Krumholz & Mentlik, LLP

(57) ABSTRACT

The present invention provides a method and a system for providing at least one communications service to one or more service providers by a communications service provider. Communications capabilities of the communications service provider are sliced into a plurality of virtual slices and each of the plurality of virtual slices is configured for a different service provider from among the one or more service providers. At least one communications service is provided to each of the one or more service providers through a respective configured virtual slice by the communications service provider. Each of the one or more service providers further provides the communications service to a user through the respective configured virtual slice in collaboration with the communications service provider.

30 Claims, 9 Drawing Sheets

METHOD AND SYSTEM FOR PROVIDING REAL-TIME COMMUNICATIONS SERVICES

CROSS-REFERENCE TO RELATED APPLICATIONS

This application is a divisional of pending U.S. patent application Ser. No. 13/071,668, filed Mar. 25, 2011, the disclosure of which is incorporated herein by reference.

BACKGROUND OF THE INVENTION

The invention relates generally to providing real-time communications service to a user by a service provider. In particular, the invention relates to a method and system for providing real-time communications service to a user by a service provider in collaboration with a communications service provider.

Service providers, as the name suggests, provide various services to their subscribers. Examples of service providers include, but are not limited to, a healthcare provider, a financial services provider, an internet service provider and so forth. Typically, a user has to subscribe to a service provider to avail the services offered by the service provider. Once the user registers himself with the service provider, the user can avail the services of the service provider. Over the years, service providers have been trying to provide more and more value-added services to their subscribers.

An example of a service that a healthcare service provider may want to provide to its users is a remote healthcare service. Such a service may enable the user to avail healthcare services remotely while sitting at home. In the current scenario, the healthcare provider can provide such a service to its users as long as the healthcare provider has broadband connectivity and its users have the same. However, such an arrangement will have at least the following limitation: to provide such a service, the healthcare provider will have to incur capital and operational expenses. The capital expense would come from the bank of high-end application servers, video servers, and expensive networking equipment. The operational expense would come from high-bandwidth leased lines, running a full-fledged IT service to maintain the networking infrastructure and the servers, keeping them operational 24X7, and employing highly skilled personnel who would be responsible for maintaining and managing sophisticated multimedia communications system for setting up multiparty connections between the desired parties.

It can be seen that having such an arrangement does not make economic sense for the healthcare provider to incur all these expenses associated with managing a complex communications infrastructure since managing communications infrastructure is not its competency.

On the other hand, managing communications infrastructure is the core competency of a communications service provider. As is known, a communications service provider provides telecommunication services to its subscribers. Recently, communications service providers have started video and mobile services, in addition to voice and data services. The subscribers of such a communications service provider could be both: other service providers, such as the service providers mentioned earlier, and end users. In order to stay competitive and realize the full potential of the communications infrastructure, the communications service providers need to provide value-added services to their users, especially other service providers. These other service providers, in turn, should be able to utilize these value-added services in offering novel services to their users.

Thus, there is a need for a method and a system that will enable the communications service provider to provide various value-added services to service providers. Further, the method and system should also enable the service providers to provide novel services to their users without incurring any additional capital and operational expenses.

BRIEF SUMMARY OF THE INVENTION

The present invention relates to a method for providing at least one communications service to one or more service providers by a communications service provider. The method includes slicing communications capabilities of the communications service provider into a plurality of virtual slices. The communications capabilities comprise a set of predefined core services in addition to communications infrastructure. The method further includes configuring each of the plurality of virtual slices for a different service provider from among the one or more service providers. Configuring each of the plurality of virtual slices comprises customizing the communications capabilities for each of the plurality of virtual slices based on a rule-set provided by the one or more service providers. Finally, the method includes providing at least one communications service to each of the one or more service providers through a respective configured virtual slice by the communications service provider. Each of the one or more service providers is capable of providing the communications service to a user through the respective configured virtual slice.

The present invention relates to a system for providing at least one communications service to one or more service providers by a communications service provider. The system includes a platform configured to provide a communications service provider with the ability to slice communications capabilities of the communications service provider into a plurality of virtual slices. The communications capabilities comprise a set of predefined core services in addition to communications infrastructure. The platform is further configured to configure each of the plurality of virtual slices for a different service provider from among the one or more service providers. Configuring each of the plurality of virtual slices comprises customizing the communications capabilities for each of the plurality of virtual slices based on a rule-set provided by the one or more service providers. Additionally, the platform is configured to provide at least one communications service to each of the one or more service providers through a respective configured virtual slice by the communications service provider. Each of the one or more service providers is capable of providing the communications service to a user through the respective configured virtual slice.

The present invention relates to a method for providing a communications service to at least one user over a communication channel by a service provider, wherein the service provider is allocated a virtual slice of communication capabilities by a communications service provider for providing the communications service. The method includes receiving a request for the communications service from the user through a communication device, wherein the request is received by the service provider offering the service the user having access to the communication device. The method further includes authenticating the user based on a set of user credentials provided by the user at the time of creating the request. The method also includes transmitting, to the communications service provider, a list of one or more agents capable of providing the communications service along with the request, the list being formed based on a first set of predefined factors.

Further, the method includes analyzing the request in accordance with a rule-set to identify one of the one or more agents, wherein the one of the one or more agents are identified by the communications service provider based on a second set of predefined factors. Additionally, the method includes establishing a connection between the identified agent and at least one communication device of the user through which the user accesses the communications service over the communication channel.

The present invention relates to a system for providing a communications service to at least one user over a communication channel. The system includes a first platform configured to provide at least one service provider with the ability to receive a request for a communications service offered by the service provider, the request received from a user through a communication device over the communication channel. The first platform is further configured to authenticate the user based on a set of user credentials provided by the user at the time of creating the request. Additionally, the first platform is configured to transmit, to a communications service provider, a list of one or more agents capable of providing the communications service along with the request, the list formed based on a first set of predefined factors. The system also includes a second platform configured to provide a communications service provider with the ability to analyze the request in accordance with a rule-set to identify one of the one or more agents, wherein the one of the one or more agents are identified based on a second set of predefined factors. The second platform is also configured to establish a connection between the identified agent and the communication device of the user through which the user accesses the communications service over the communication channel.

The present invention relates to a system for providing a communications service to a user over a communication channel. The system includes a plurality of interfaces configured to interface with at least a service provider, a communications service provider, and at least one communication device. The system further includes a reception module configured to receive a request for a communications service from the service provider, wherein the request received by the service provider from the user. The reception module is also configured to receive a list of one or more agents capable of solving the request, the list formed by the service provider based on a first set of predefined factors. The system further includes an analysis engine configured to analyze the request in accordance with a rule-set to identify one of the one or more agents, wherein the one of the one or more agents is identified based on a second set of predefined factors. Finally, the system includes a communication module configured to provision communication resources for establishing a connection between the identified agent and the user based on the analysis, wherein the communications service provider subsequently establishes the connection between the identified agent and at least one communication device over the communication channel.

BRIEF DESCRIPTION OF THE DRAWINGS

These and other features, aspects, and advantages of the present invention will be better understood when the following detailed description is read with reference to the accompanying drawings in which like characters represent like parts throughout the drawings, wherein.

DETAILED DESCRIPTION

The following description is the full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to get an advantage without the corresponding use of other features described in the following paragraphs. As such, the present description should be considered as merely illustrative of the principles of the present technique and not in limitation thereof, since the present technique is defined solely by the claims.

The present invention, in its entirety, discloses a multimedia multimode communications platform that is deployed at a communications service provider's end. The communications platform interfaces with one or more service providers as also with multiple user devices registered with the one or more service providers and the communications service provider. The communications platform enables the communications service provider to provide communications services to one or more service providers. Further, the communications platform enables the one or more service providers to provide various communications services to multiple users using communications capabilities of the communications service provider. As used in the context of this disclosure, a communications service refers to a service that is managed by the one or more service providers in conjunction with the communications service provider. Various embodiments of the present invention have been described below in conjunction with figures.

Figure 1:
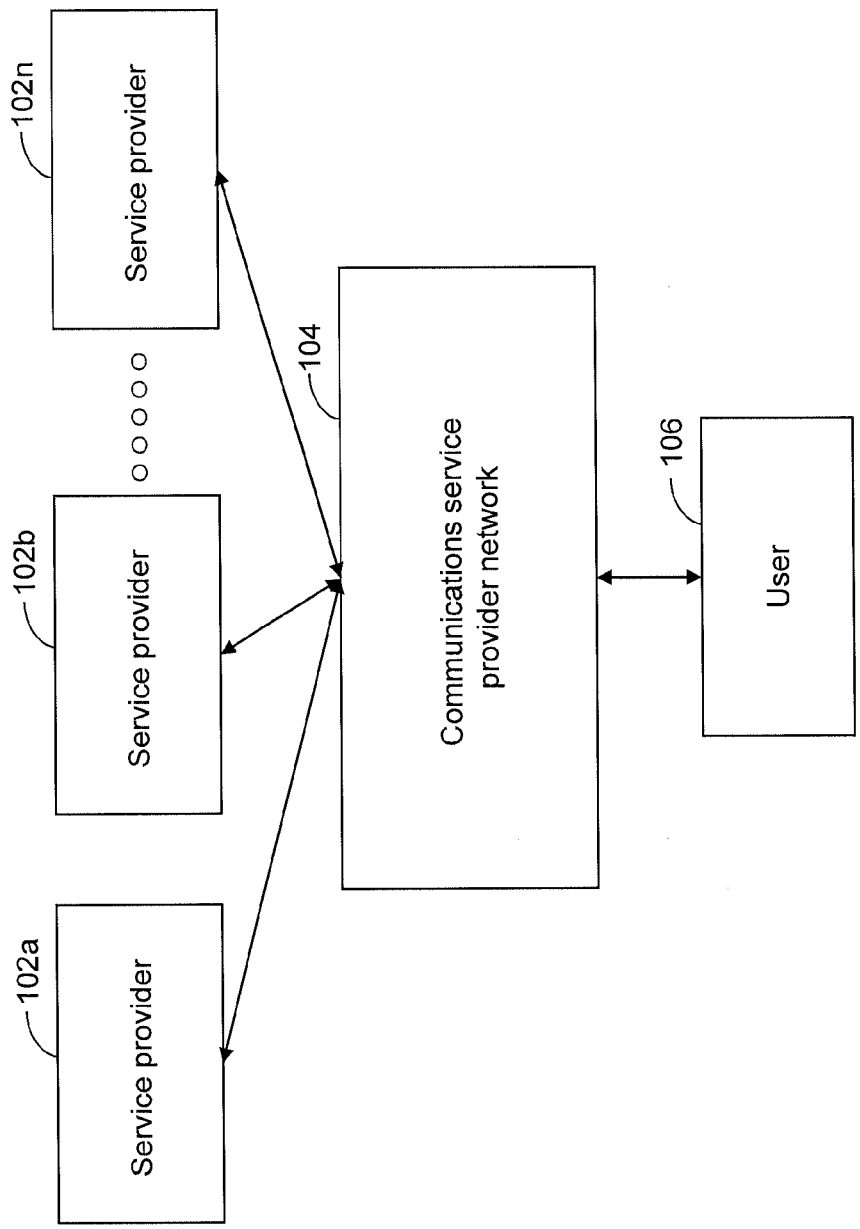
FIG. 1 shows an environment 100 in which the present invention can be practiced in accordance with an embodiment of the present invention.

FIG. 1 shows an environment 100 in which the present invention can be practiced, in accordance with an embodiment of the present invention. Environment 100 includes service providers 102a-102n, a communications service provider network 104, and a user 106.

In accordance with various embodiments of the present invention, communications capabilities of communications service provider network 104 are distributed among service providers 102a-102n in the form of virtual slices. Each of the service providers 102a-102n then provides a communications service to user 106 through the virtual slices allocated to it. That is, service providers 102a-102n utilize the communication capabilities of communications service provider network 104 and provide the communications service to user 106. Details on the communications capabilities of communications service provider network 104 have been described in conjunction with FIG. 2.

Service providers 102a-102n provide different services to user 106. Examples of services that service providers 102a-102n may provide include, but are not limited to, healthcare, banking, hospitality, and consulting. It should be noted that each service provider from among service providers 102a-102n may provide a different service to user 106. The method of providing different services to user 106 by service providers 102a-102n has been described in detail in conjunction with FIG. 4 and FIG. 5. As used herein, a communications service refers to a service that is managed by service provider 102 in conjunction with communications service provider 104.

In accordance with various embodiments of the present invention, communications service provider network 104 may be any type of communication network that is capable of transmitting information, such as voice, data, short messaging (SMS), multimedia messaging (MMS), facsimiles, and any other type of information that may be transmitted in accordance with methods of this invention including a PSTN, a GSM network, TDMA, UMTS, GPRS, and any other known or later developed network. In accordance with an embodiment of the present invention, the communications service provider (not shown in the figure) controlling communications service provider network 104 is a telecom operator. However, the communications service provider may also include cable companies, satellite TV providers, internet service providers, and so forth.

User 106 is registered with both service provider 102 and communications service provider network 104. User 106 has at least one communication device (not shown in the figure) through which user 106 accesses the communications service provided by service provider 102. The communication device may include a mobile phone, a laptop, a desktop computer, a multimedia messaging device (MMS), a short messaging device (SMS), and/or any other type of commercially available communication device capable of communicating through the communications service provider network 104.

Figure 2:
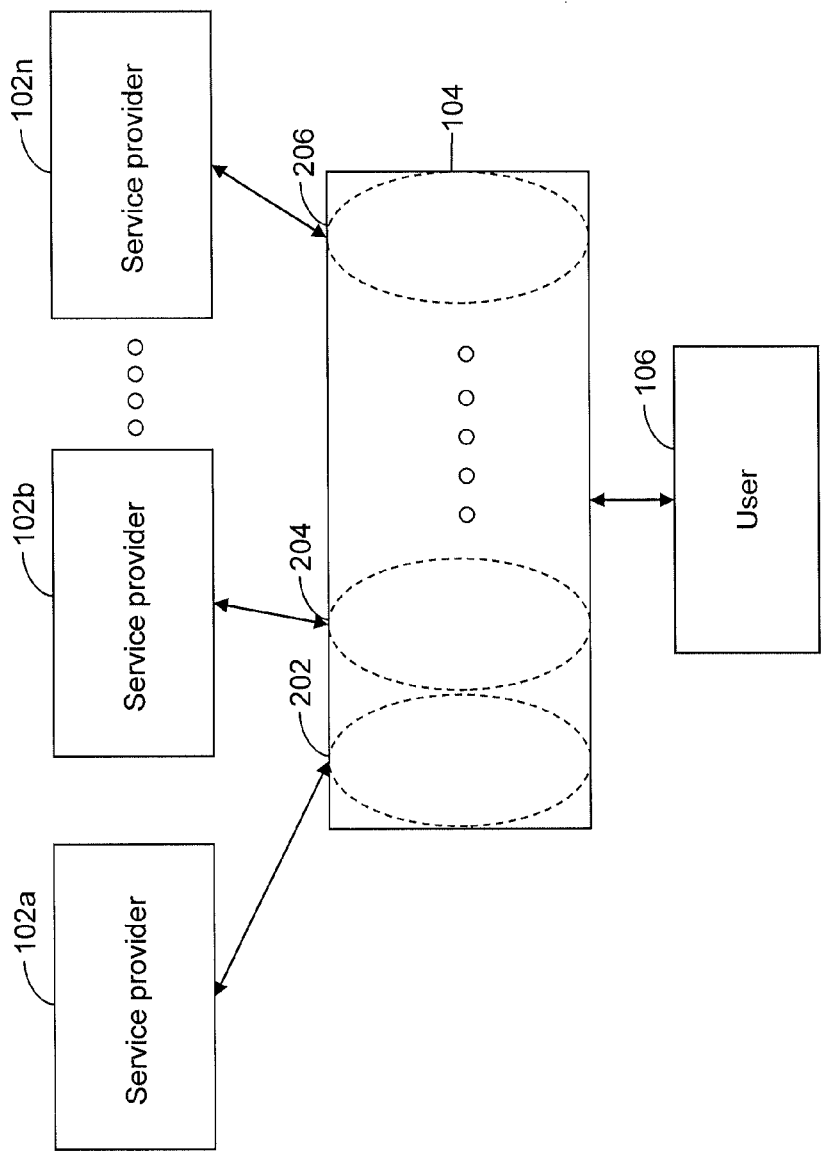
FIG. 2 is a block diagram depicting allocation of virtual slices to multiple service providers by a communications service provider 104 in accordance with an embodiment of the present invention.

FIG. 2 is a block diagram depicting allocation of virtual slices of communications service provider network 104 to multiple service providers 102a-102n in accordance with an embodiment of the present invention. FIG. 2 includes multiple service providers 102a-102n, a communications service provider network 104 and a user 106. As shown in the figure, communications capabilities associated with communications service provider network 104 are divided into multiple individual slices 204, 206 and 208.

In accordance with various embodiments of the present invention, the communication capabilities of communications service provider network 104 enable provision of one or more communications services to each of service providers 102a-102n. The communications capabilities of communications service provider network 104 include various predefined core services along with communications infrastructure. The predefined core services include, but are not limited to, location-based service, presence-based service, subscriber authentication service, multimedia service, instant messaging service, notification service, interactive voice service, conferencing service, and media streaming service.

Through the virtual slices allocated to service providers 102a-102n by the communications service provider, each service provider provides one or more communications service to user 106. In other words, the communications service is jointly managed by a service provider, from among service providers 102a-102n, and the communications service provider and provided to user 106. As depicted in the figure, all the virtual slices are non-overlapping.

In accordance with an embodiment of the present invention, each of service providers 102a-102n provides a rule-set to the communications service provider (not shown in the figure) controlling communications service provider network 104. The rule-set defines, among other things, a service flow for each of the communications services being provided through communications service provider network 104 to each service provider. The communications service may be of two types: basic service and composite service. A basic service refers to a service that is delivered by invoking only one or two predefined core services and does not involve evaluation of any complex rules. A composite service, on the other hand, refers to a service that is delivered by invoking more than two predefined core services. Additionally, the composite service usually involves complex rule sets to be evaluated. Thus, the rule-set includes a service flow for each communications service along with any other rules specific to each service provider.

Thus, the communications capabilities of communications service provider network 104 are virtually sliced and each virtual slice, such as virtual slices 204, 206 and 208, is allocated to an individual service provider from among the service providers 102a-102n. Prior to allocating the virtual slices to a service provider, however, the communications service provider configures each virtual slice based on the rule-set provided by the service providers 102a-102n. It should be noted that configuring each virtual slice includes customizing the communications capabilities of each of the virtual slices based on the rule-set provided by the service providers 102a-102n. Further, configuring the virtual slice also includes provisioning a set of network resources by the communications service provider. In accordance with various embodiments of the present invention, the network resources include, but are not limited to, bandwidth and access/traffic channels. Through the individual virtual slices of communications service provider network 104, one or more communications service is provided to service providers 102a-102n. Each of the service providers 102a-102n further provides the communications service to one or more users. The method for providing the communications service to the one or more users by the service providers 102a-102n is described in conjunction with FIG. 4 to FIG. 7.

In accordance with various embodiments of the present invention, a predefined billing model is established among the service provider, the communications service provider and the user. As per the billing model, the communications service provider bills the service provider based on usage of the communications capabilities of a respective virtual slice by the service provider. Further, the service provider bills the user based on the usage of the communications service by the user. Similarly, an assurance model is also established between the service provider and the communications service provider that enables equitable sharing of risks associated with delivering the communications service between the service provider and the communications service provider. Furthermore, a revenue model is also established for distributing revenues between the service provider and the communications service provider in proportion to value delivered by the respective configured virtual slice to its respective service provider.

In accordance with an embodiment of the present invention, the communications service provider provides the one or more communications service to each of the service providers 102a-102n in accordance with a predefined service level agreement (SLA) between the involved parties. As is known in the art, an SLA is a service contract where the level of service is formally defined between the involved parties. Typically, the SLA specifies various parameters such as levels of availability, serviceability, performance, operation, or any other attributes of the service (for example, billing, assurance etc.). In accordance with an embodiment of the present invention, the SLA may be any of a dynamic SLA and a static SLA. A dynamic SLA refers to an SLA that is negotiated every time prior to providing the service. In other words, certain aspects of the SLA may need to be negotiated every time before the communications service provider provides the communications service to each of the service providers 102a-102n. On the other hand, a static SLA does not involve negotiation every time the service is provided. It is also possible that the SLA contains both a static SLA section and a dynamic SLA section.

Figure 3:
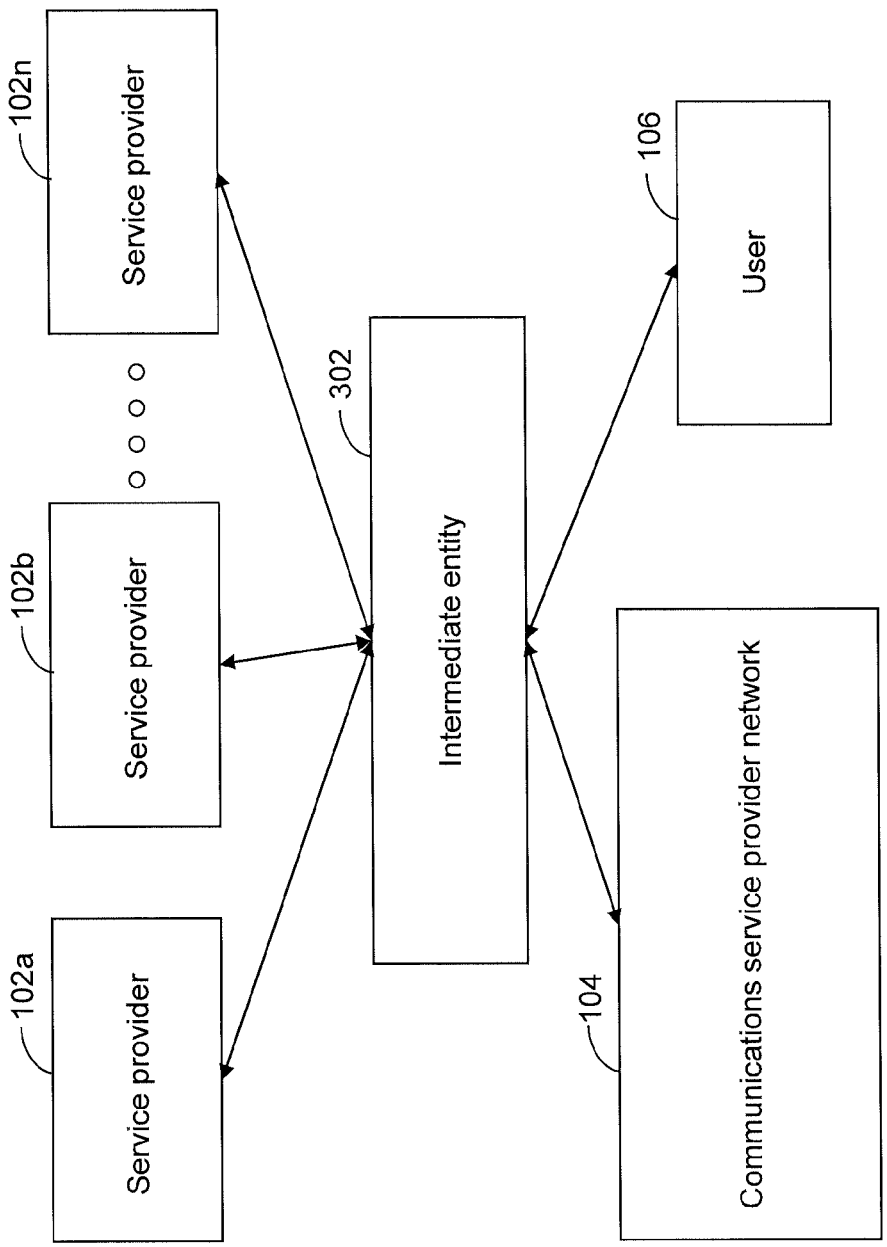
FIG. 3 shows an environment 200 in which the present invention can be practiced in accordance with another embodiment of the present invention.

FIG. 3 shows an environment 300 in which the present invention can be practiced in accordance with another embodiment of the present invention. Environment 300 includes multiple service providers 102a-102n, an intermediate entity 302, a communications service provider network 104 and a user 106. Service providers 102a-102n provide various communications services to user 106 who accesses a communications device (not shown in the figure) available at intermediate entity 302. The communications services are provided to user 106 through communications service provider network 104.

In accordance with an embodiment of the present invention, intermediate entity 302 is a multi-service kiosk controlled by a kiosk service provider (not shown in the figure). The kiosk may have a communication device, such as a personal computer, that may be accessed by various users, such as user 106. That is, the kiosk service provider (KSP) leverages communications capabilities of communications service provider network 104 and makes the communications service available to multiple service providers 102a-102n. The multiple service providers 102a-102n, in turn, provide the communications service to various users, such as user 106.

In accordance with an embodiment of the present invention, user 106, who is registered with service provider 102a, for example, visits intermediate entity 302 and provides personal information for authentication purposes. Intermediate entity 302 transmits the personal information of user 106 to service provider 102a. Service provider 102a authenticates user 106 based on the personal information and provides a communications service requested by user 106 through communications service provider network 104. User 106 accesses the communications service at the communications device present at intermediate entity 302. For example, service provider 102a may arrange for a live video conference to be set up between user 106 and a business expert (not shown in the figure) through the communications device present at intermediate entity 302. It should be noted that more than two parties may also be involved in the video call. Thus, intermediate entity 302 provides access to various communications services delivered through communications service provider network 104. The communications services include, but are not limited to, broadband, video calls, and streaming video.

Provision of the communications service to user 106 may also involve factors such as language translation and subsequent text-to-speech conversion. The language translation and text-to-speech conversion are performed by the communications service provider controlling communications service provider network 104 using techniques known in the art. In addition, the communications service provider is also capable of handling providing quality of service on the video call, trans-coding video content to suit capability of the communications device and connection at intermediate entity 302, setting up a secure multi-party multi-media conference call on demand. Details of the capabilities of the communications service provider have been explained in conjunction with FIG. 4.

Figure 4:
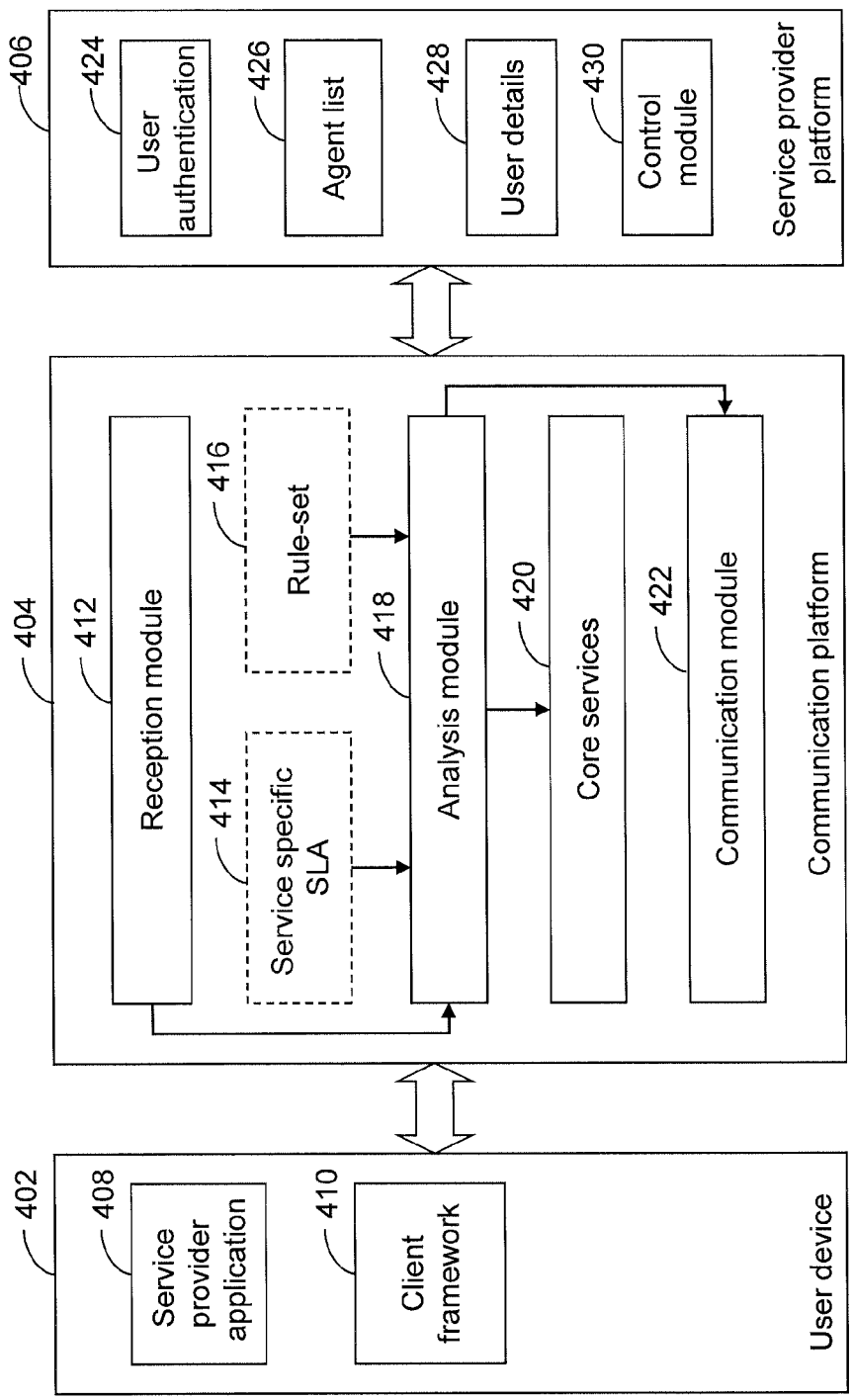
FIG. 4 is a block diagram depicting various modules of a system 400 for providing a communications service to a user in accordance with an embodiment of the present invention.

FIG. 4 is a block diagram depicting various modules of a system 400 for providing a communications service to a user in accordance with an embodiment of the present invention. System 400 includes a user device 402, a communication platform 404, and a service provider platform 406. User device 402 includes a service provider application 408 and a client framework 410. Communication platform 404 includes a reception module 412, a service-specific SLA 414, a rule-set 416, an analysis module 418, core services 420 and a communications module 422. Service provider platform 406 includes a user authentication module 424, an agent list 426, user details 428, and a control module 430.

User device 402 creates a request through service provider application 408 for accessing a communications service provided by a service provider (not shown in the figure) controlling service provider platform 406. User device 402 sends the request to service provider platform 406. User authentication module 424 receives the request and authenticates the user based on details provided by the user at the time of creating the request. Based on the authentication results, control module 430 analyzes the request to check the type of communications service desired by the user. Control module 430 then accesses agent list 426 and user details 428 to identify a list of agents capable of providing the communications service to the user based on a set of predefined factors. Control module 430 further transmits the list of agents and the request to communication platform 404. Reception module 412 receives the request along with the list of agents and forwards it to analysis module 418. Analysis module 418 accesses service-specific SLA 414 and rule-set 416 and then selects an agent from among the list of agents capable of providing the communications service to the user. Communications module 422 establishes a connection between the user and the selected agent by provisioning a set of network resources.

User device 402 includes a service provider application 408 and a client framework 410. In accordance with various embodiments of the present invention, service provider application 408 is an application specific to the service provider that allows the user to connect or log on to the service provider channel. Client framework 410 enables operation of service provider application 408 on user device 402. Thus, for example, in case user device 402 is a laptop, service provider application 408 may be a service provider's website and client framework 410 may be a browser that enables the user to log on to and access the service provider's website. In accordance with an embodiment of the present invention, client framework 410 is provided by the communications service provider to enable operation of service provider application 408, provided by the service provider. User device 402 may be any of a mobile phone, a personal digital assistant, a television, a desktop computer and a laptop.

Service provider platform 406 receives the request sent by the user through user device 402. User authentication module 424 compares the details entered by the user at the time of creating the request with the corresponding details of the user stored in user details 428. In accordance with various embodiments of the present invention, the details provided by the user may include any unique login details of the user such as name of the user, a registration number of the user provided by the service provider and/or the communications service provider, a password and so forth. User authentication module 424 authenticates the user based on the comparison and passes the authentication results to control module 430. In accordance with an embodiment of the present invention, user authentication module 424 is a database. In case the authentication fails, an error message is displayed to the user on user device 402.

Based on the authentication results, control module 430 analyzes the received request and forms a list of agents capable of providing the communications service to the user based on predefined factors that include, but are not limited to, user profile, user subscription details, communications service requested and qualifications of the one or more agents. Each of these predefined factors will now be described in further detail. It should be noted that, in an embodiment, the functionality of control module 430 may be performed by user authentication module 424 itself.

The user profile refers to personal details of the user provided by the user at the time of registration that are stored with the service provider. However, the user profile also provides information on current device capabilities of the user. For example, the user profile may provide information on details such as memory of user device 402, audio-video capabilities of user device 402, and so forth. The user profile further includes preferences of the user with respect to the communications device on which the user wishes to access the communications service. In other words, though the user creates the request through user device 402, the user may wish to access the communications service on a different device. For example, the user may create the request through a mobile device but may want to have a video chat with an agent through a television. The user profile is identified by analysis module 418 before setting up a connection between the user and a selected agent, as will be explained in the subsequent paragraphs.

The user subscription details refer to the level of subscription of the user. In accordance with various embodiments of the present invention, the level of subscription may be of two types: communication-based subscription level and service-based subscription level. Through the communication-based subscription level, the user selects the mode of communication over a combination of user devices. That is, the user may choose to subscribe to a number of devices, such as television, mobile phone and a personal computer. Further, the user may also choose the mode of communication for the subscribed devices such as text, audio and video communication. In accordance with an embodiment, the service-based subscription level is specific to the type of services provided by the service provider. For example, if the service provider is a healthcare provider, the user may subscribe to any or all of consultative services, advisory services and so forth.

In accordance with another embodiment of the present invention, subscription of the user may be of various types that define the type of service that can be made available to the user. For example, a user may have subscribed to bronze-level service which makes available only voice calls. Another user may have subscribed to gold-level service which makes the user eligible for multimedia calls. Still another user may have subscribed to platinum-level service which ensures that the user is entitled to guaranteed service within a specific duration of time. Such levels of subscription may be defined by the service provider when the user wants to register for the services offered by the service provider.

The list of agents selected also depends on the type of communications service requested by the user. For example, the user may demand consultation with an expert in real-time before deciding whether the user should invest in a particular stock option. Hence, a human agent is selected in such a case. In another case, the user may want general information about stock options available to him. Thus, in this case, a media server having a video file containing the general information on stock options may be selected. Additionally, the qualifications of the agents are also considered before forming the agent list. In other words, factors such as experience of the agent, background of the agent, and so forth may be considered to arrive at an individual score for each agent and based on the individual scores, the list of agents may be formed. It should be noted that the qualifications of the agents are provided to the service provider by the agents at the time of registration. In accordance with an embodiment of the present invention, control module 430 keeps updating the individual scores of the agents at regular intervals based on a feedback provided by the user.

Thus, control module 430 forms the list of agents capable of providing the desired communications service and sends the list to reception module 412. In accordance with an embodiment of the present invention, control module 430 prioritizes the list of agents based on a predefined factor, such as, for example, the individual scores before handing over the list to reception module 412. Further, control module also sends the request to reception module 412.

Reception module 412 receives the list of agents along with the request and forwards the list and the request to analysis module 418. In accordance with an embodiment of the present invention, reception module 412 performs another level of authentication before passing on the request to analysis module 418. This authentication may be performed based on the user details available with the communications service provider. In case the authentication fails, reception module 412 does not forward the information to analysis module 418. Instead, an error message may be displayed to the user on user device 402.

Analysis module receives the list of agents and the request from reception module 412. Analysis module 418 then accesses service-specific SLA 414 and a rule-set 416. Features of service-specific SLA 414 and rule-set 416 have been described in detail in conjunction with FIG. 2 and hence, will not be described here. Analysis module 418 analyzes the request and based on the user subscription details, dynamically selects a set of communications services available to the user. That is, analysis module 418 checks whether the user has actually registered to the communications service that the user desires to access. Analysis module 418 also dynamically selects content accessible to the user based on at least one of the user profile and the user subscription details. In other words, analysis module 418 checks whether the content desired to be accessed by the user can be provided to the user on the user's communications device by analyzing the user profile. For example, if the communications device registered by the user for accessing the service does not have video capabilities and the user requests to have a video call with an agent, analysis module 418 notifies the user accordingly.

In accordance with various embodiments of the present invention, analysis module 418 also determines quality of service (QoS) requirements for the communications service dynamically. Analysis module 418 dynamically maps the communications service with the QoS requirements as specified in service-specific SLA 414. It should be noted that service-specific SLA 414 may have a dynamic SLA component, as described earlier in conjunction with FIG. 2.

Analysis module 418 then selects an agent from among the list of agents handed over by reception module 412. In accordance with various embodiments of the present invention, analysis module 418 selects the agent based on at least one of network connectivity of the one or more agents, current location of the one or more agents, availability of the one or more agents, device capabilities of communication devices registered by the one or more agents, type of the communications service requested, urgency of the communications service requested, and overall accessibility scores of the one or more agents. The overall accessibility scores of the agents may be calculated by taking into account the network connectivity of the agents, their current location, and other such parameters. Thus, analysis module 418 selects the agent most suitable for providing the communications service to the user. For example, if the user is subscribed to premium service and is connected to an Internet Protocol Television (IPTV), analysis module 418 may select an agent who is also connected to broadband IPTV. It should be noted that urgency of the communications service requested is also specified by the user at the time of creating the request.

Based on the communications service requested by the user, analysis module 418 invokes corresponding core services 420 and passes on the details of the selected agent to communication module 422. Core services 420 include the predefined core services, explained earlier in conjunction with FIG. 2. In accordance with an embodiment of the present invention, analysis module 418 also identifies location of the agents and the location of the user requesting the communications service before selecting the agent. It will be appreciated that analysis module 418 performs its various functions with the help of core services 420 and by adding intelligence to the predefined core services.

Communication module 422 receives the agent details and the user details from analysis module 418. Communications module 422 provisions necessary network resources for establishing a connection between a communications device of the selected agent and the communications device of the user. In accordance with various embodiments of the present invention, communications module 422 establishes the connection through invocation of one or more core services from among core services 420 by analysis module 418. Further, depending on the type of communications device of the user, communication module 422 provisions the communications device. Thus, for example, if the communications device is a television, communications module 422 may provision a set-top box associated with the television before establishing the connection. However, in case the communications device of the user is a mobile phone, provisioning of the mobile phone may not be necessary.

Communication module 422 notifies the selected agent about the request and sends the details of the user to the selected agent on a communications device registered by the user. Communications module 422 further establishes a connection between the communications device of the user and a suitable communications device of the selected agent. It should be noted that the user may create a request through one communications device but may access the communications service on another communications device, based on the user's preferences and the user profile. Similarly, the agent may be notified on one communications device but he may interact with the user through another communications device. As discussed earlier, the connection may be any of a video call, an audio call, and so forth.

In accordance with an embodiment of the present invention, communication platform 404 includes multiple service templates (not shown in the figure) that consist of various basic services that include, but are not limited to, selecting an agent based on the rule-set provided by a service provider, dynamically provisioning QoS and security in the network and any necessary communication elements, dynamically setting up an end-to-end connection between user device 402 and the selected agent, notifying the selected agent about the impending request by the user, and sending user details to the selected agent. It will be apparent to a person skilled in the art that using these service templates, any service may be quickly instantiated thereby improving the efficiency of the overall system. It will be understood that communication platform 404 includes multiple interfaces for interfacing with user device 402 and service provider end 406.

Figure 5:
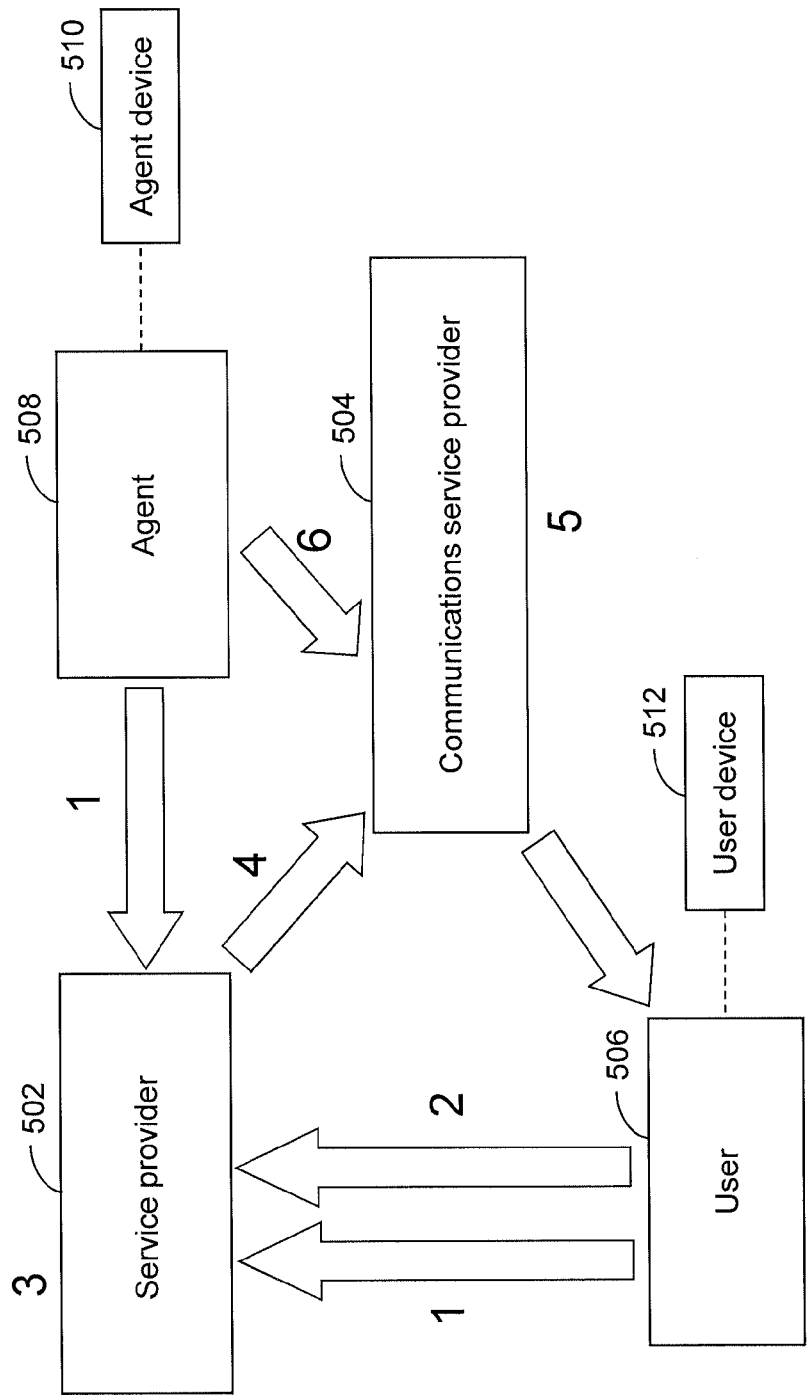
FIG. 5 is a block diagram depicting the flow of events between various system elements in accordance with an embodiment of the present invention.

FIG. 5 shows separation of roles between a service provider and a communications service provider, in accordance with an embodiment of the present invention. FIG. 5 includes a service provider 502, a communications service provider 504, a user 506, an agent 508, a user device 510 and an agent device 512.

At step 1, user 506 and agent 506 register with service provider 502. It should be noted that the registration process is a one-time process. At step 2, user 506 requests for a communications service offered by service provider 502 through a user device 512 registered by user 506 with service provider 502 at the time of registration. Service provider 502 receives the request and at step 3, authenticates user 506 based on details entered by user 506 at the time of creating the request. Service provider 502 compares the details entered by the user at the time of creating the request with the registration details to authenticate user 506. Further, service provider checks subscription details of user 506 and generates a list of agents, such as agent 508, capable of providing the communications service to user 506. Service provider 502 then provides the request details, user subscription details, and the list of agents to communications service provider 504.

Communications service provider 504 receives the information from service provider 502 and based on a set of rules provided by service provider 502 earlier, selects an agent, for example, agent 508 from among the list of agents. Communications service provider 504 further checks the user profile of user 506 and the availability of agent 508 on a registered communications device, such as agent device 510. Communications service provider 504 then notifies agent 508 about the request and passes the request details to agent 508. Further, communications service provider 504 provisions a set of network resources and user device 512, if needed, and subsequently establishes a connection between user 506 and agent 508 so that user 506 and agent 508 may interact through a communications session. The communications session may be any of a video call, an audio call, and so forth.

Figure 6:
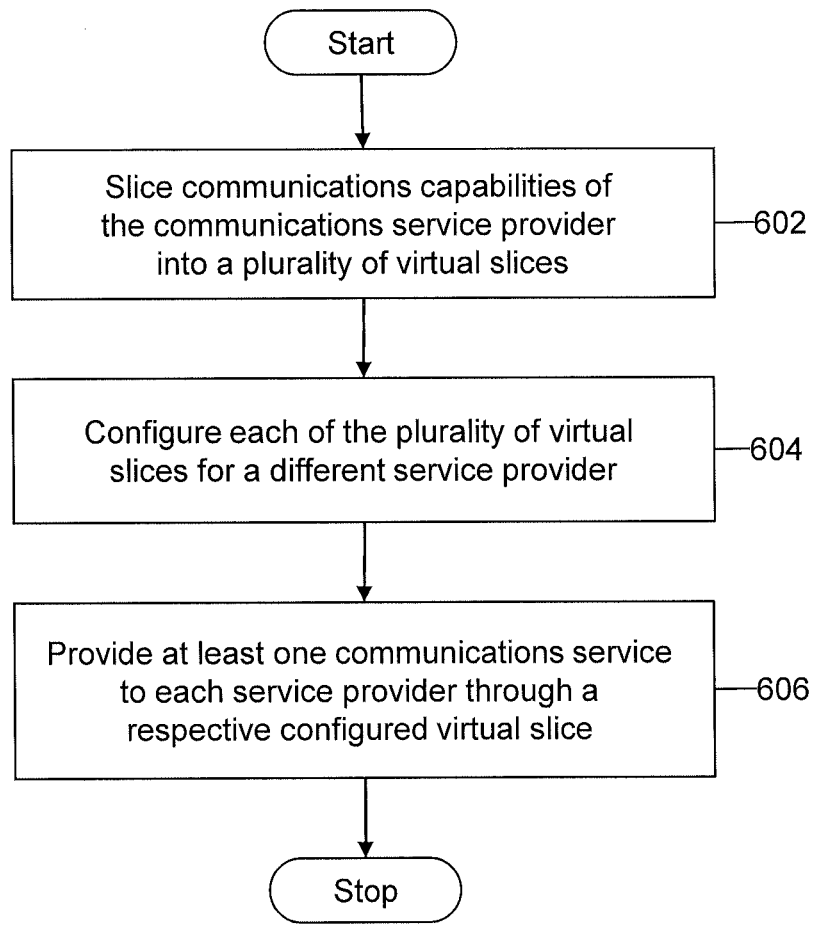
FIG. 6 is a flow chart depicting a method for providing a communications service to one or more service providers by a communications service provider, in accordance with an embodiment of the present invention.

FIG. 6 is a flowchart depicting a method for providing a communications service to one or more service providers by a communications service provider, in accordance with an embodiment of the present invention.

At step 602, communication capabilities of a communications service provider are divided into multiple non-overlapping virtual slices. In accordance with an embodiment of the present invention, the communication capabilities of the communications service provider include various predefined core services along with communications infrastructure. The predefined core services include, but are not limited to, location-based service, presence-based service, subscriber authentication service, multimedia service, instant messaging service, notification service, interactive voice service, conferencing service, and media streaming service.

At step 604, each of the plurality of virtual slices is configured for a different service provider. In accordance with an embodiment of the present invention, configuring each virtual slice includes customizing the communications capabilities of each of the virtual slices based on the rule-set provided by the service providers. Further, configuring the virtual slice also includes provisioning a set of network resources by the communications service provider. In accordance with various embodiments of the present invention, the network resources include, but are not limited to, bandwidth and access/traffic channels.

At step 606, through the virtual slices, one or more communications service is provided to the service providers by the communications service provider. Each of the service providers then provides the communications service to one or more users through the virtual slices, that is, using the communications capabilities of the communications service provider.

Figure 7:
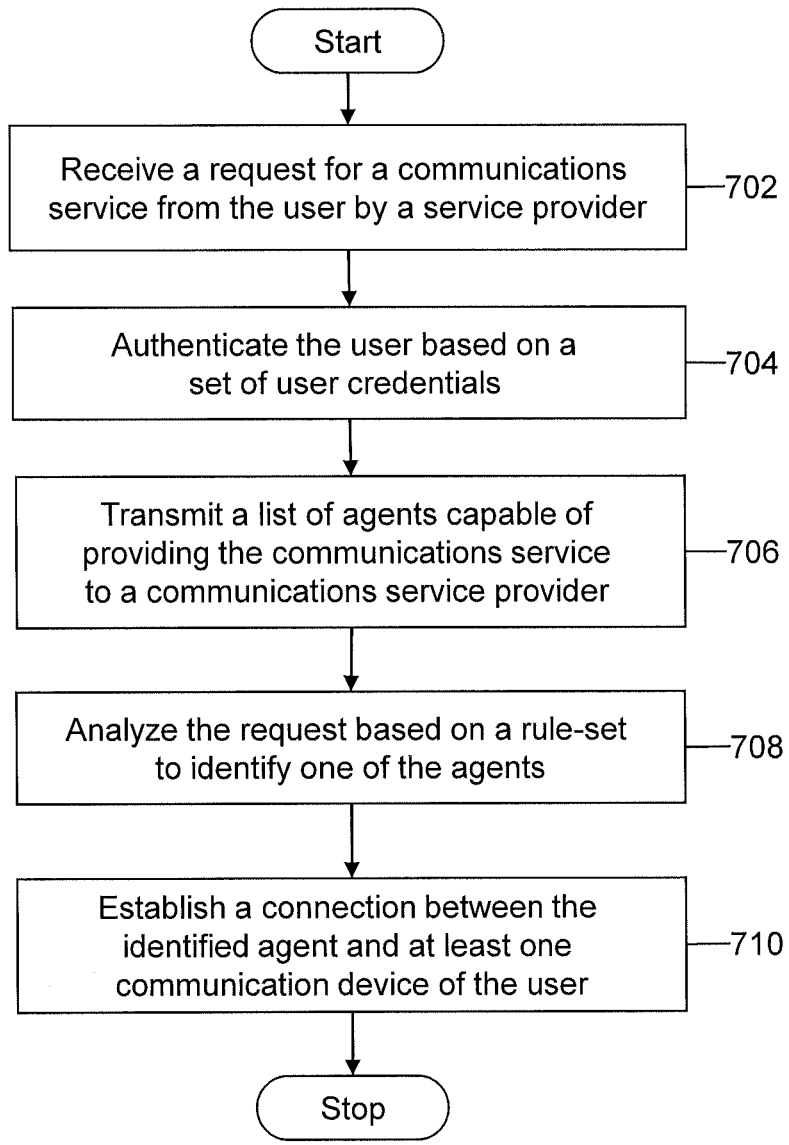
FIG. 7 is a flow chart depicting a method for providing a communications service to a user by a service provider, in accordance with an embodiment of the present invention.

FIG. 7 is a flowchart depicting a method for providing a communications service to a user by a service provider, in accordance with an embodiment of the present invention.

At step 702, a request for a communications service is received by a service provider. In accordance with an embodiment of the present invention, the request is created by a user through a communications device registered by the user with the service provider. The communications device may be any of a mobile phone, a personal digital assistant, a television, a desktop computer and a laptop.

At step 704, the service provider authenticates the user based on details entered by the user at the time of creating the request. The service provider may compare the details entered by the user with registration details of the user stored with the service provider to authenticate the user. Further, the service provider analyzes the request to determine the type of communications service is desired by the user. The service provider then identifies a list of agents capable of providing the communications service to the user based on a set of predefined factors. In accordance with an embodiment of the present invention, the predefined factors include, but are not limited to, user profile, user subscription details, communications service requested and qualifications of the one or more agents.

At step 706, the service provider transmits the list of one or more agents capable of providing the communications service to a communications service provider. In accordance with an embodiment of the present invention, the service provider prioritizes the list of one or more agents before sending the list to the communications service provider.

At step 708, the communications service provider analyzes the request and based at least on user subscription details, a predefined SLA and a rule-set, dynamically selects a set of communications services available to the user. Further, communications service provider also dynamically selects content accessible to the user based on at least one of the user profile and the user subscription details. Additionally, the communications service provider also selects an agent from among the list of one or more agents based on at least one of network connectivity of the one or more agents, current location of the one or more agents, availability of the one or more agents, device capabilities of communication devices registered by the one or more agents, type of the communications service requested, urgency of the communications service requested, and overall accessibility scores of the one or more agents.

At step 710, the communications service provider provisions network resources necessary to establish a connection between a communications device registered by the identified agent and a communication device of the user. The connection may be any of a video call, an audio call, and so forth. Subsequently, the communications service provider notifies the selected agent about the request and establishes a connection between the selected agent and the user.

Figure 8:
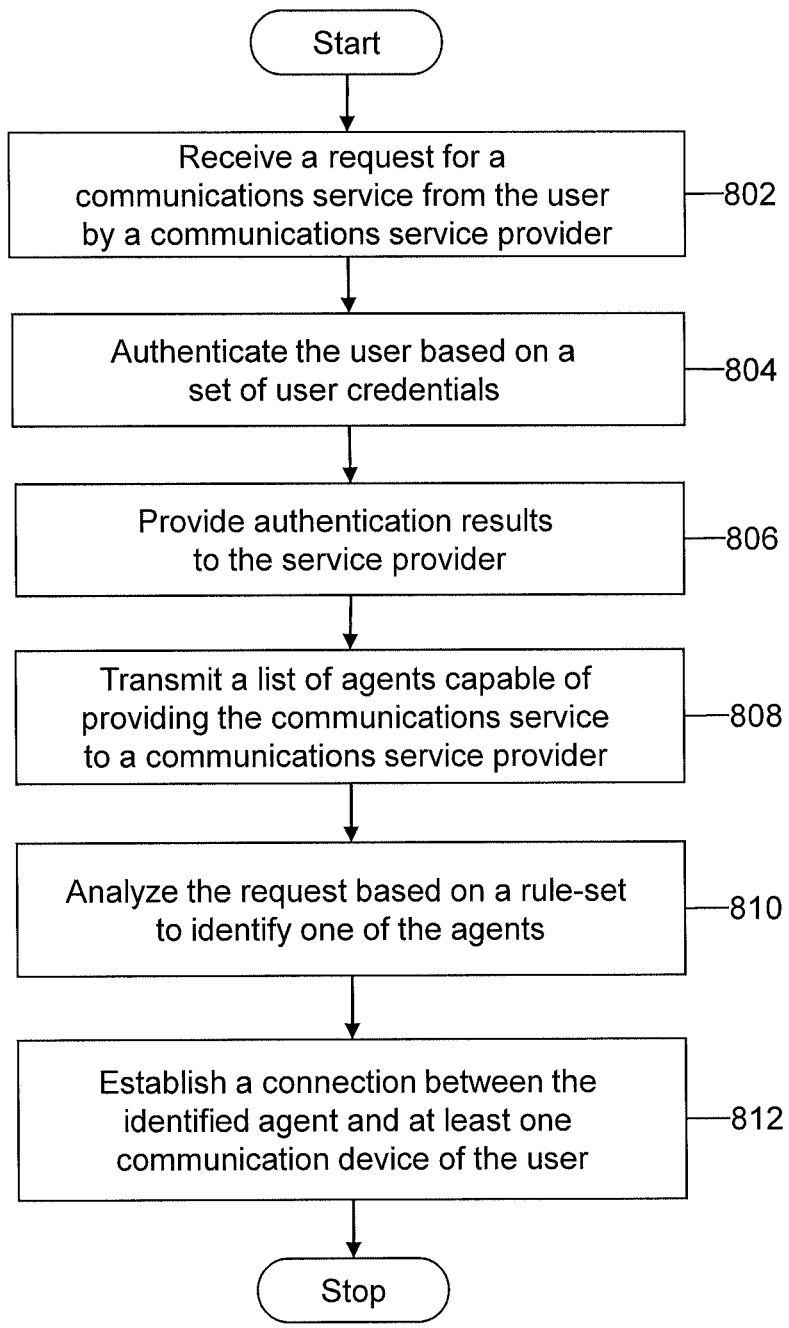
FIG. 8 is a flow chart depicting a method for providing a communications service to a user by a service provider, in accordance with another embodiment of the present invention.

FIG. 8 is a flowchart depicting a method for providing a communications service to a user by a service provider, in accordance with another embodiment of the present invention.

At step 802, a request for a communications service is received by a communications service provider. In accordance with an embodiment of the present invention, the request is created by a user through a communications device registered by the user with the communications service provider. The communications device may be any of a mobile phone, a personal digital assistant, a television, a desktop computer and a laptop.

At step 804, the communications service provider authenticates the user based on details entered by the user at the time of creating the request. The communications service provider may compare the details entered by the user with registration details of the user stored with the communications service provider to authenticate the user.

At step 806, the communications service provider sends the authentication results to the service provider. In accordance with various embodiments of the present invention, the communications service provider also passes the request created by the user to the service provider.

At step 808, the service provider performs a second-level authentication of the user based on the registration details available at the service provider's end and analyzes the request to identify a list of agents capable of providing the communications service to the user based on a set of predefined factors. In accordance with an embodiment of the present invention, the predefined factors include, but are not limited to, user profile, user subscription details, communications service requested and qualifications of the one or more agents.

At step 810, the communications service provider analyzes the request and based at least on user subscription details, a predefined SLA and a rule-set, dynamically selects a set of communications services available to the user. Further, communications service provider also dynamically selects content accessible to the user based on at least one of the user profile and the user subscription details. Additionally, the communications service provider also selects an agent from among the list of one or more agents based on at least one of network connectivity of the one or more agents, current location of the one or more agents, availability of the one or more agents, device capabilities of communication devices registered by the one or more agents, type of the communications service requested, urgency of the communications service requested, and overall accessibility scores of the one or more agents.

At step 812, the communications service provider provisions network resources necessary to establish a connection between a communications device registered by the identified agent and a communication device of the user. Subsequently, the communications service provider notifies the selected agent about the request and establishes a connection between the selected agent and the user. The connection may be any of a video call, an audio call, and so forth.

Thus, the present invention discloses a multimedia multimode communications platform that is deployed at a communications service provider's end. The communications platform interfaces with one or more service providers as also with multiple user devices registered with the one or more service providers and the communications service provider. The communications platform enables the communications service provider to provide communications services to one or more service providers. Further, the communications platform enables the one or more service providers to provide various communications services to multiple users using communications capabilities of the communications service provider.

Exemplary Computing Environment

Figure 9:
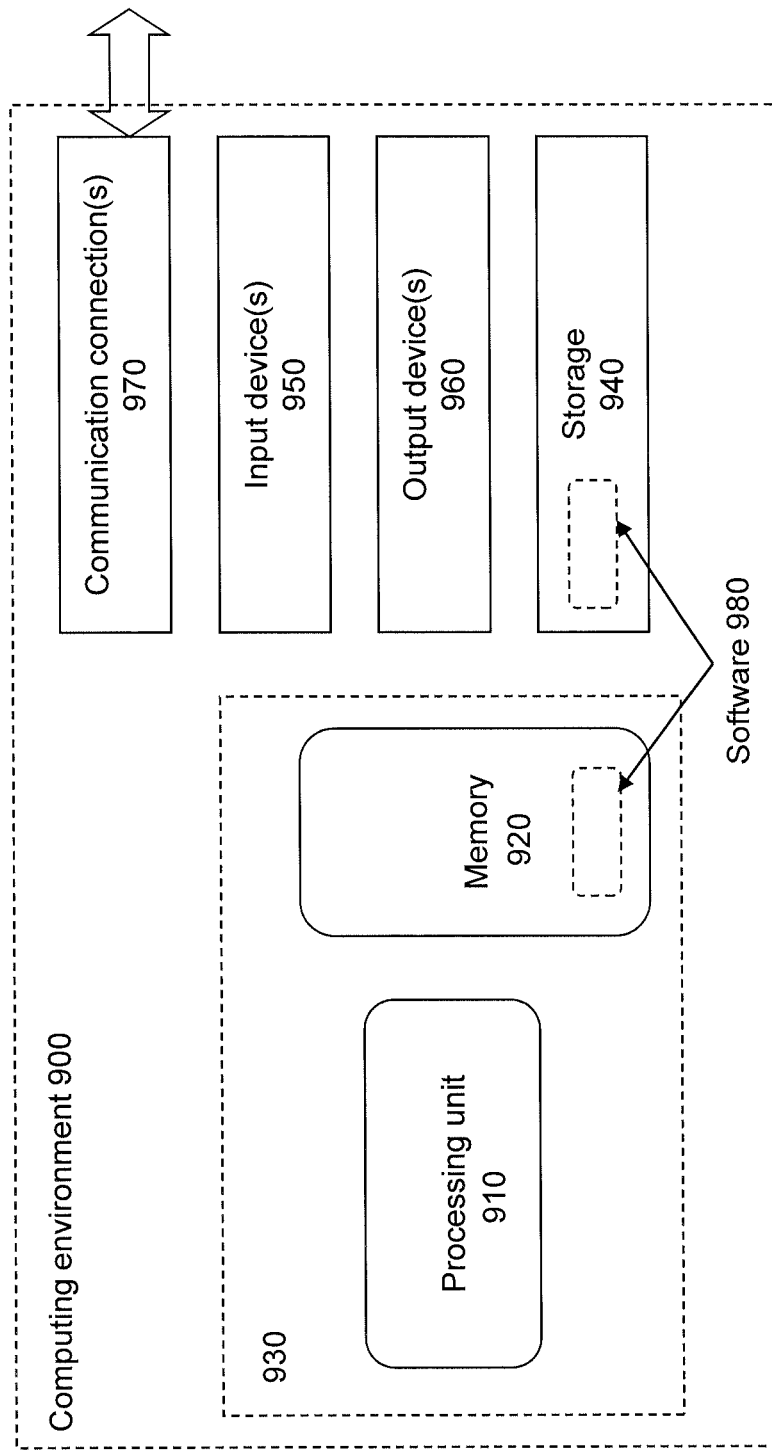
FIG. 9 illustrates a generalized example of a computing environment 900.

One or more of the above-described techniques can be implemented in or involve one or more computer systems. FIG. 9 illustrates a generalized example of a computing environment 900. The computing environment 900 is not intended to suggest any limitation as to scope of use or functionality of described embodiments.

With reference to FIG. 9, the computing environment 900 includes at least one processing unit 910 and memory 920. In FIG. 9, this most basic configuration 930 is included within a dashed line. The processing unit 910 executes computer-executable instructions and may be a real or a virtual processor. In a multi-processing system, multiple processing units execute computer-executable instructions to increase processing power. The memory 920 may be volatile memory (e.g., registers, cache, RAM), non-volatile memory (e.g., ROM, EEPROM, flash memory, etc.), or some combination of the two. In some embodiments, the memory 920 stores software 980 implementing described techniques.

A computing environment may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The storage 940 may be removable or non-removable, and includes magnetic disks, magnetic tapes or cassettes, CD-ROMs, CD-RWs, DVDs, or any other medium which can be used to store information and which can be accessed within the computing environment 900. In some embodiments, the storage 940 stores instructions for the software 980.

The input device(s) 950 may be a touch input device such as a keyboard, mouse, pen, trackball, touch screen, or game controller, a voice input device, a scanning device, a digital camera, or another device that provides input to the computing environment 900. The output device(s) 960 may be a display, printer, speaker, or another device that provides output from the computing environment 900.

The communication connection(s) 970 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 900, computer-readable media include memory 920, storage 940, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

The invention claimed is:

1. A method for providing a communications service, the method comprising:
    configuring one or more computer processors for:
        partitioning a communications service provider network into a plurality of non-overlapping virtual slices, each virtual slice comprising:
            communications infrastructure including at least a defined communication bandwidth, and
            at least two predefined network services that are distinct from the communications infrastructure;

receiving a request for the communications service from the user through the at least one communication device, wherein the request is received by the service provider offering the service;

authenticating the user based on a set of user credentials provided by the user at the time of creating the request;

forming a list of one or more agents capable of providing the communications service to the user along with the request, the list being formed based on a first set of predefined factors, wherein the first set of predefined factors comprises qualifications and experiences of the one or more agents;

calculating accessibility scores of the one or more agents based on network connectivity of the one or more agents, current location of the one or more agents, and availability of the one or more agents;

transmitting the list from the service provider to the communications service provider;

accessing the list and analyzing the request in accordance with a rule-set to identify one of the one or more agents, the one of the one or more agents being identified by the communications service provider based on a second set of predefined factors, wherein the second set of predefined factors comprises accessibility scores of the one or more agents; and establishing a connection between the identified agent and at least one communication device of the user through which the user accesses the communications service over the communication channel via the allocated one or more virtual slices.

2. The method as recited in claim 1, wherein the first set of predefined factors further comprises at least one of user profile, user subscription details, and communications service requested.

3. The method as recited in claim 1, wherein the step of analyzing the request is preceded by the step of prioritizing the list of one or more agents by the service provider.

4. The method as recited in claim 2, wherein the step of analyzing the request comprises the step of dynamically selecting a set of communications services available to the user based on the user subscription details.

5. The method as recited in claim 2, wherein the step of analyzing the request comprises the step of dynamically selecting content accessible to the user based on at least one of the user profile and the user subscription details.

6. The method as recited in claim 2, wherein the step of analyzing the request comprises the step of dynamically determining quality of service requirements for the communications service.

7. The method as recited in claim 6, wherein the step of dynamically determining quality of service requirements comprises the step of dynamically mapping the communications service with predefined quality of service requirements.

8. The method as recited in claim 2, wherein the step of establishing the connection between the identified agent and the at least one communication device is preceded by the step of provisioning the at least one communication device by the communications service provider based on the user profile.

9. The method as recited in claim 1, wherein the step of establishing the connection between the identified agent and the at least one communication device is preceded by the step of provisioning a plurality of network resources by the communications service provider.

10. The method as recited in claim 1, wherein the rule-set comprises a service flow for each communications service offered by the service provider.

11. The method as recited in claim 1, wherein the second set of predefined factors comprises at least one of network connectivity of the one or more agents, current location of the one or more agents, availability of the one or more agents, device capabilities of communication devices registered by the one or more agents, type of the communications service requested, urgency of the communications service requested, and overall accessibility scores of the one or more agents.

12. The method as recited in claim 1, wherein the communication device is at least one of a mobile phone, a personal digital assistant, a television, a desktop computer and a laptop.

13. The method as recited in claim 1, wherein the identified agent is a server.

14. The method as recited in claim 1, wherein the identified agent is a human agent.

15. The method as recited in claim 14, wherein the step of establishing the connection between the identified agent and the at least one communication device comprises the step of establishing a connection between one or more communication devices registered by the human agent and the at least one communication device of the user.

16. The method as recited in claim 1, further comprising billing the at least one user by the service provider based on usage of the communications service by the user.

17. A system for providing a communications service, the system comprising:

one or more computer processors configured to:
(i) partition a communications service provider network into a plurality of non-overlapping virtual slices, each virtual slice comprising:
communications infrastructure including at least a defined communication bandwidth, and
at least two predefined network services that are distinct from the communications infrastructure;
(ii) configure a first platform to provide at least one service provider with the ability to:
receive a request for a communications service offered by the service provider, the request received from the user through the at least one communication device over the communication channel;
authenticate the user based on a set of user credentials provided by the user at the time of creating the request; and
form a list of one or more agents capable of providing the communications service to the user along with the request, the list formed based on a first set of predefined factors, wherein the first set of predefined factors comprises qualifications and experiences of the one or more agents;
calculate accessibility scores of the one or more agents based on network connectivity of the one or more agents, current location of the one or more agents, and availability of the one or more agents;
transmit the list from the service provider to the communications service provider; and
(iii) configure a second platform to provide a communications service provider with the ability to:
access the list and analyze the request in accordance with a rule-set to identify one of the one or more agents, the one of the one or more agents being identified based on a second set of predefined factors, wherein the second set of predefined factors comprises accessibility scores of the one or more agents; and establish a connection between the identified agent and at least one communication device of the user through which the user accesses the communications service over the communication channel via the allocated one or more virtual slices.

18. The system as recited in claim 17, wherein the first set of predefined factors further comprises at least one of user profile, user subscription details, and communications service requested.

19. The system as recited in claim 18, wherein the communications service provider dynamically selects a set of communications services available to the user based on the user subscription details.

20. The system as recited in claim 18, wherein the communications service provider dynamically selects content accessible to the user based on at least one of the user profile and the user subscription details.

21. The system as recited in claim 17, wherein the communications service provider dynamically determines quality of service requirements for the communications service.

22. The system as recited in claim 21, wherein the communications service provider dynamically maps the communications service with predefined quality of service requirements to determine the quality of service requirements for the communications service.

23. The system as recited in claim 17, wherein the communications service provider provisions the at least one communication device based on the user profile prior to establishing the connection between the identified agent and the at least one communication device.

24. The system as recited in claim 17, wherein the communications service provider provisions a plurality of network resources prior to establishing the connection between the identified agent and the at least one communication device.

25. The system as recited in claim 17, wherein the rule-set comprises a service flow for each communications service offered by the service provider.

26. The system as recited in claim 17, wherein the second set of predefined factors comprises at least one of network connectivity of the one or more agents, current location of the one or more agents, availability of the one or more agents, device capabilities of communication devices registered by the one or more agents, type of requested communications service requested, urgency of the communications service requested, and overall accessibility scores of the one or more agents.

27. The system as recited in claim 17, wherein the communication device is at least one of a mobile phone, a personal digital assistant, a television, a desktop computer and a laptop.

28. The system as recited in claim 17, wherein the identified agent is a server.

29. The system as recited in claim 17, wherein the identified agent is a human agent.

30. The system as recited in claim 29, wherein the communications service provider establishes a connection between one or more communication devices registered by the human agent and the at least one communication device of the user.

\* \* \* \* \*